United States Patent [19]

Wright

[11] 3,914,689

[45] Oct. 21, 1975

[54] SELF POWERING TEMPERATURE COMPENSATED RECTIFIER FOR MEASURING CURRENT

[76] Inventor: Charles S. Wright, 7901 Jansen Court, Springfield, Va.

[22] Filed: May 6, 1974

[21] Appl. No.: 467,581

[52] U.S. Cl. .................................. 324/119; 324/95
[51] Int. Cl.² ................... G01R 19/22; G01R 21/10
[58] Field of Search .............................. 324/119, 95

[56] References Cited
UNITED STATES PATENTS

| | | | |
|---|---|---|---|
| 1,966,047 | 7/1934 | Ryall | 324/119 |
| 2,137,846 | 11/1938 | Klutke | 324/119 |
| 2,198,226 | 4/1940 | Peterson | 324/119 |
| 2,294,065 | 8/1942 | Anderson | 324/119 |

*Primary Examiner*—Alfred E. Smith
*Assistant Examiner*—Ernest F. Karlsen
*Attorney, Agent, or Firm*—A. Yates Dowell, Jr.

[57] ABSTRACT

The current measuring device provides for measuring the power in radio frequency waves without requiring any source of power for the measuring device except the radio waves themselves, and the device includes a rectifier to change alternating current to direct current by a solid state diode, but a solid state diode has an offset voltage of approximately 0.4 volt and to provide compensation for this offset a second diode is used in opposed relation to the first diode and the second diode is powered from the source of alternating current by a third diode so the resulting voltage from the device is linear and the extrapolation of the linearity passes through the origin of the graph thereby providing for measuring currents with extreme accuracy over a large temperature range without requiring an additional source of power and without requiring thermisters or bolometers. The output of the circuit can be directly applied to an analog/digital converter (A/D converter) to obtain a digital reading of the analog of the circuit.

6 Claims, 2 Drawing Figures

SELF POWERING TEMPERATURE COMPENSATED RECTIFIER FOR MEASURING CURRENT

In measuring alternating currents and particularly alternating currents produced by radio frequency waves, it has been necessary to use complicated equipment which required a source of power in addition to the radio waves being received and also the equipment was subject to varying degrees of inaccuracy depending upon the temperature of the various components, and this has been particularly true where solid state diodes were used in rectifying the alternating current. It is desirable to have a straight line linear relation between the meter current and volts of alternating current, and it is particularly desirable that the straight line linearity pass through or is extrapolated through the origin of a graph having the meter current as the ordinate and volts as the abscissa.

The prior art has made use of diodes for the purpose of rectifying a current to make measurements of this type, but the offset of the diode i.e. the voltage required for the first current to pass is in the order of 0.4 volt and therefore the graph of current with respect to voltage does not pass through the origin of the graph. Although efforts have been made to overcome the offset voltage by applying an opposed voltage of the same value, the required offset voltage changes with temperature and therefore, if the equipment varies in temperature, the results are inaccurate. Although thermisters and bolometers have been used to overcome this problem, they have not been entirely satisfactory and have required complicated circuits and complicated equipment and still produce unsatisfactory results.

The present invention makes use of a diode in the silicon family of diodes such as IN4148 to rectify the alternating current to direct current to be measured by a direct current meter. Since the offset voltage of the diode is approximately 0.4 volt no current passes until this 0.4 volts is applied to the diode, and to overcome this offset a second diode is opposed to the first diode so the current reading meter would indicate a zero flow of current when the offset voltage is applied from the source of alternating current. To supply the offset current to the second diode a third diode is provided which receives its power from the alternating current source being measured, and this provides the offset voltage for the second diode thereby producing the linear curve of flow of current of the first diode with respect to the voltage to be a straight line which extrapolates through the origin of the graph. Thus a substantially straight line graph is produced between the alternating current voltage from the source of alternating current and the output of the circuits. The output current of the circuit may be applied to a metering means such as a meter or to an A/D converter for a digital readout or the like. The three diodes are mounted in the same box so that each is subject to the same ambient temperature and therefore the circuit is self compensating for wide temperature ranges.

Referring more particularly to the drawing wherein.

Figure 1:
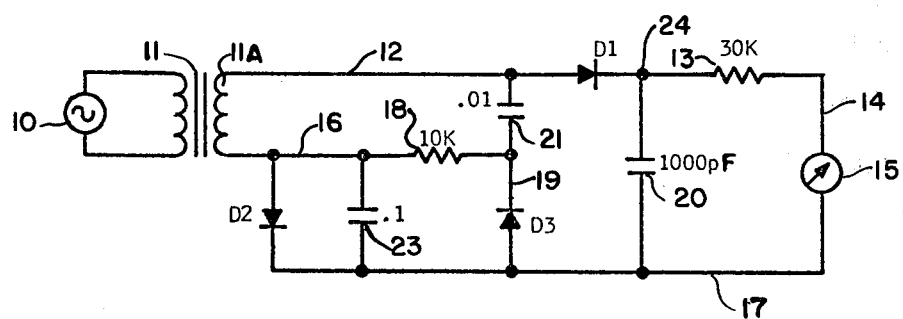
FIG. 1 is a schematic wiring diagram showing the source of alternating current as a toroidal transformer, the three diodes with various resistances and capacitances of the self powering temperature compensated rectifier with the output fed to a metering means such as an A/D converter or to a direct current meter.

The self powered temperature compensated rectifier current measuring device of the present invention is particularly useful in measuring the power of radio stations without requiring an external source of power and in FIG. 1 a self powering device shows a source of alternating current 10 which current may be formed by radio waves passing into an antenna forming the primary of a toroidal transformer 11 which causes an alternating current to be formed in the secondary 11A of the toroidal transformer and one lead 12 from the secondary of the transformer is connected to one terminal of a rectifying solid state diode D1 with the other terminal of the first diode D1 being connected to one terminal of a first resistor 13 which is the voltage multiplying resistor for the meter 15. The other terminal of the first resistor is connected to one output lead 14 connected to one terminal of a direct current meter or A/D converter 15. Another lead 16 from the other terminal of the secondary 11A is connected to one terminal of a second solid state diode D2 opposed to said first diode. Another output lead 17 to another terminal of said A/D converter or meter 15 is connected to the other terminal of the second diode D2. The lead 16 from the other terminal of the secondary 11A of the transformer 11 is connected to one terminal of a second resistor 18, the other terminal of the resistor 18 being connected to a junction shown as a Y-shaped lead 19. A first capacitor 20 is connected between the connection of the other terminal of the first diode with the first terminal of the resistor 13 and the other lead 17 from the other terminal of the meter 15. A second capacitor 21 is connected between the lead 12 from the source of alternating current and the Y-shaped lead 19. A third capacitor 23 has one terminal connected to the other lead 16 from the source of alternating current and the other output lead 17 to the other terminal of the direct current meter 15.

A third diode D3 is connected between the lead 17 and the Y-shaped lead.

When the self powering temperature compensated rectifier for measuring current is used the radio waves are collected on an antenna which is connected to the primary of a toroidal transformer and such radio waves produce an alternating current in the secondary of the toroidal transformer which alternating current is changed to direct current through the solid state diode D1 and passes through the resistance 13 and lead 14 to the meter 15, the circuit being completed through the other lead 17 from the meter to the other lead 16 from the secondary 11A of the transformer.

However, to avoid the offset of approximately 0.4 volts of the diode D1, the second diode D2 permits an opposed current to pass through the diode D2 and to also pass through diode D3 to which it is connected by output lead 17 and complete the circuit through capacitance 21 to the first lead of the transformer.

To provide the necessary current for the offset diode D2 the diode D3 furnishes the power required for the offset voltage of diode D2 through output lead 17 from diode D2 to the Y-shaped lead 19 through the resistance 18 to the other lead 16 from the secondary from the transformer.

Figure 2:
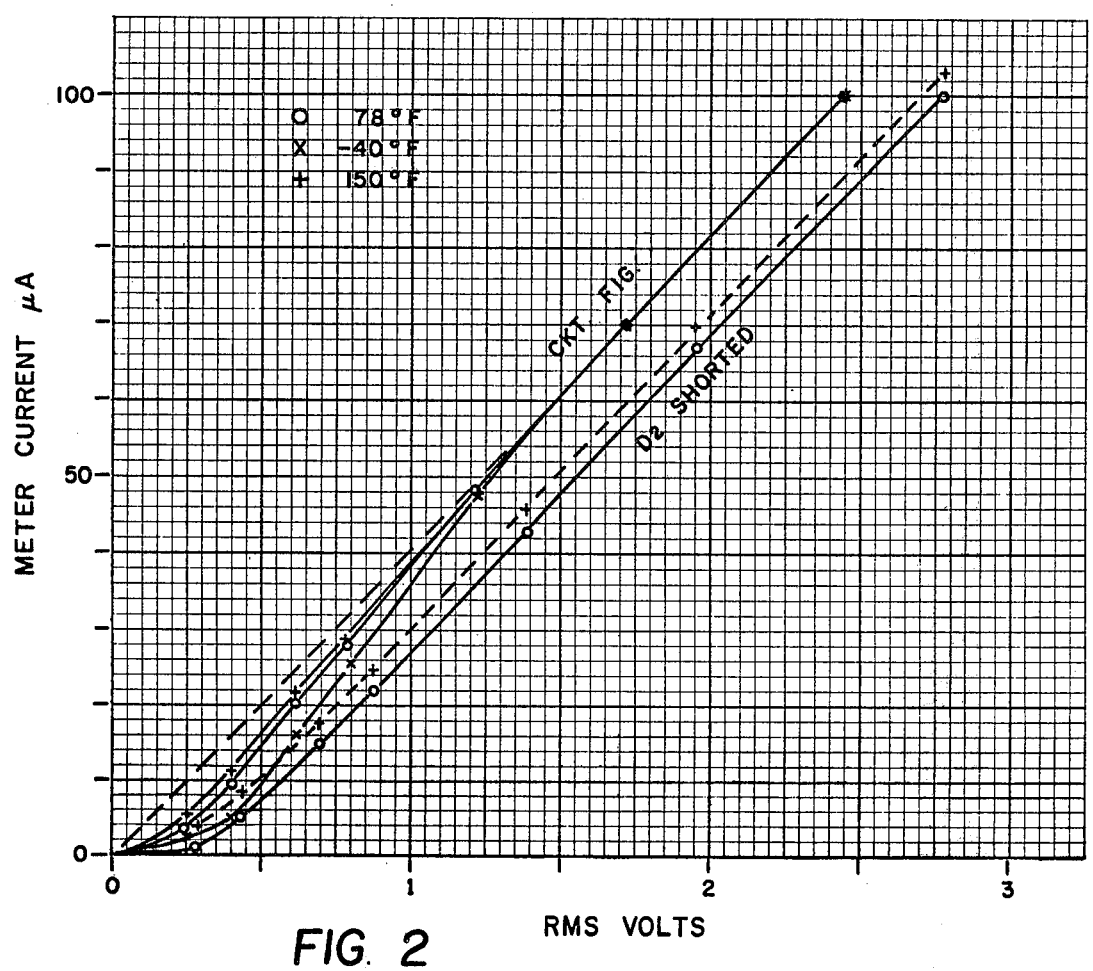
FIG. 2 is a graph showing the linear relation of volts to current produced by the circuit of FIG. 1 with a dotted line extension of the linear curve passing through the origin of the graph and showing variations of the offset which is avoided by the present invention.

In other words diode D1 is the signal rectifier, D2 is the compensating diode, and D3 is the source of compensating current for diode D2. This circuit, of course, fails at very low signal levels because of the offset of D3 prevents it from supplying enough compensation current. It, thus, has a limited dynamic range, which must be considered in any application. FIG. 2 shows the low range response of this circuit at various ambient temperatures. These data were measured in the Delta Laboratory along with the same circuit without compensation for comparison. This was accomplished by simply shorting diode D2 for the 78° and 150° measurements. It is seen that above 1.25 volts the circuit of FIG. 1 conforms quite accurately to a linear curve with a zero intercept. With D2 shorted, the response is linear over most of the range but intercepts at an offset voltage that varies with temperature. A good fit with a zero intercept linear curve cannot be obtained under these conditions. The lack of a zero intercept can be compensated for easily when the circuit is used with an analog milliammeter by suitably marking the scale on the meter face. Even so, the temperature dependence remains a problem. When the circuit is to be used with an A/D (analog/digital) converter a zero intercept fit is essential.

The circuit of FIG. 1 includes a toroidal current transformer such as that manufactured by Delta Electronics, Inc. 5534 Port Royal Road, Springfield, Virginia 22151 and described in their brochure New RF Current Sampling Components Designed for Use with AM Broadcast and identified as TCT-1; a copy of the brochure is attached to this application. the impedance is very high compared to the 50 ohm source resistance RS so that a 1 V/A will appear at its input. With the meter and multiplier resistors of the circuit selected for 20 volts full scale, the meter will read currents between 1 and 20 amps quite linearly and temperature independent. If a 50 ohm shunt is placed across the input of the circuit it will become a 40 ampere meter. For small currents, the value of RS in the TCT could be changed or a suitable RF transformer used at the input to the detector circuit.

This approach to current measurement has been found to have an advantage when measuring modulated currents. Its readings will not follow modulation as will a thermoammeter if the filter components are properly selected. This advantage should permit easier and more accurate readings. The readings will, of course, follow carrier shifts.

An A/D converter can be converted directly to an output connection 24 between the first diode D1 and the other output lead 17 to the other terminal of a meter or of an A/D converter. The resistance 13 may be omitted where the voltage multiplying feature for the meter is not required and the resistance 13 may be omitted when the circuit is used with an A/D converter.

I claim:

1. A self-powering temperature compensated rectifier for measuring alternating currents comprising a first lead for connection to one terminal of a source of alternating current, a first solid state diode having one terminal connected to said first lead for connection to one terminal of a source of alternating current, a metering means, a first output lead connected between the other terminal of said first solid state diode and one terminal of said metering means, a second lead for connection to the other terminal of said source of alternating current, a second solid state diode opposed to said first diode and having one terminal of said second diode connected to said other lead from said source of alternating current, a second output lead connected between the other terminal of said second diode and the other terminal of said metering means, a first capacitor connected between said first output lead and said second output lead, a resistor having one terminal connected to said second lead for connection to the other terminal of said source of alternating current, a junction having one terminal connected to the other terminal of said resistor, a second capacitor connected between said first lead from said source of alternating current and said junction, a third solid state diode having one terminal connected to said second output lead, the other terminal of said third diode being connected to said junction, a third capacitor connected between said second lead for connection to the other terminal of said source of alternating current and and said second output lead whereby said third diode provides current to said second diode with all of the power for said self powering temperature compensated rectifier being supplied solely by the said source of alternating current being measured, the said one terminals of each diode being of the same polarity and the other terminals of each diode being of the opposite polarity.

2. The invention according to claim 1 in which another resistor is provided between said first output lead and said metering means.

3. The invention according to claim 1 in which metering means is A/D convertor.

4. The invention according to claim 1 in which the leads for connection to the source of alternating current are connected to a transformer.

5. The invention according to claim 4 in which the transformer is a toroidal transformer.

6. The invention according to claim 1 in which the metering means is a direct current meter.

* * * * *